Dec. 23, 1924.

L. BLACKMORE 1,520,681

STARTING MECHANISM

Filed Jan. 5, 1923

Inventor

Lloyd Blackmore

Patented Dec. 23, 1924.

1,520,681

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

STARTING MECHANISM.

Application filed January 5, 1923. Serial No. 610,803.

*To all whom it may concern:*

Be it known that I, LLOYD BLACKMORE, a citizen of the United States, and a resident of Highland Park, county of Wayne, and State of Michigan, have invented certain new and useful Improvements in Starting Mechanism, of which the following is a full, clear, concise, and exact description, such as will enable others skilled in the art to which the invention relates to make and use the same, reference being made therein to the accompanying drawings, which form a part of this specification.

This invention relates to starting mechanism, and is illustrated as embodied in mechanism of the type in which a starting motor is provided with a rocker arm operated by the torque of the motor to carry a grooved friction wheel against a peripherally grooved flywheel.

An object of the invention is to simplify mechanism of this character by arranging the friction wheel with grooved teeth so that it can mesh directly with a gear on the motor shaft, and to avoid any tendency to jump when the grooved wheels engage one another by arranging the grooved teeth of the friction wheel spirally, that is by arranging the separate projections or teeth in spiral rows. I prefer to make the friction wheel by securing together a plurality of disks, each formed with radial teeth thinned down to fit in the grooves of the flywheel, the teeth of the several disks, as explained above, being arranged in spiral rows.

Figure 1:
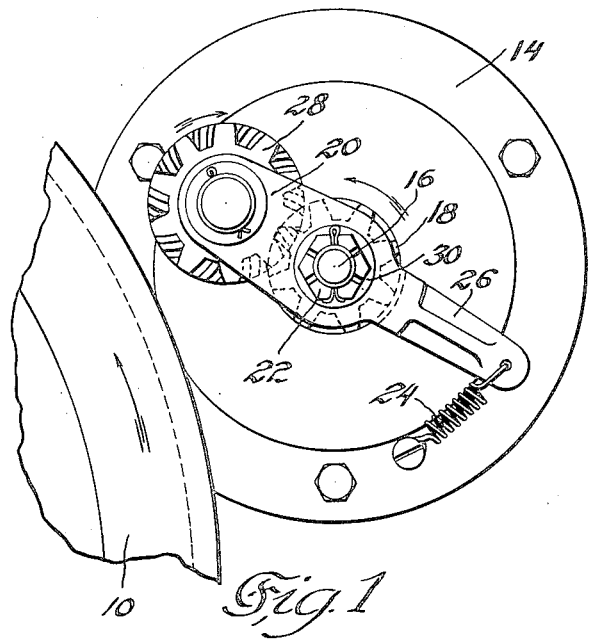
Figure 3:
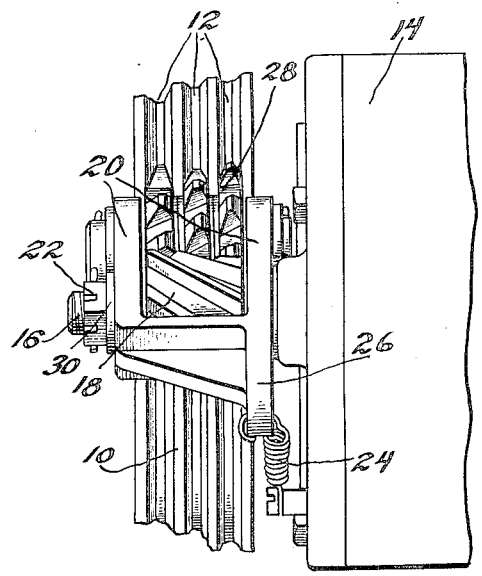
Figure 2:
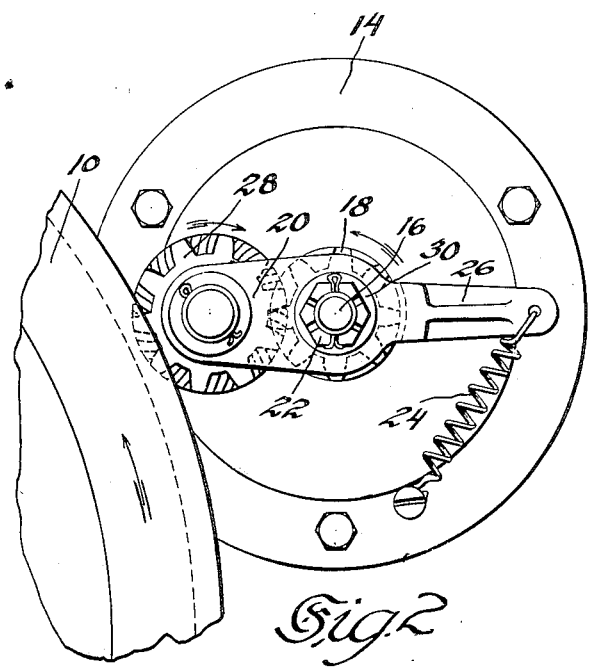

Other objects and features of the invention will be apparent from the following description of an illustrative embodiment of the invention shown in the accompanying drawings, in which:

Figs. 1 and 2 are end elevations of the mechanism, in idle and starting positions respectively; and Fig. 3 is a corresponding side elevation.

The starting mechanism shown includes a flywheel 10, peripherally grooved at 12, and a starting motor 14 having a drive shaft 16 carrying a spiral gear 18. A forked rocker arm 20 is mounted on the drive shaft, where it is held by a lock unit 22, and is normally held in idle position by a spring 24 attached to a rearwardly projecting arm 26.

Journaled in rocker arm 20 is a planetary gear or friction drive wheel 28 formed of a plurality of disks secured together, each of the disks being formed with radially projecting teeth thinned down to fit into grooves 12. As above explained and as clearly shown in the drawings, these teeth are arranged in spiral rows, so that each row may be regarded as a single grooved spiral tooth meshing with gear 18, the grooves meshing with grooves 12 when in starting position.

In order to make sure that the torque of shaft 16 will turn gear or wheel 28 into mesh with grooves 12, a friction washer 30 may be provided.

In operation, the parts being in the position shown in Fig. 1, the motor is started, whereupon the torque of shaft 16 turns the parts to the positions shown in Fig. 2, while at the same time gear 18 and gear or wheel 28 are rotated to turn flywheel 10 and start the engine. When the engine starts, and flywheel 10 begins to turn faster than gear or wheel 28, the tendency is for these members to separate, so that there is no possibility of breakage. When the current is cut off from motor 14, spring 24 returns the parts to the positions shown in Fig. 1.

While one embodiment of my invention has been illustrated and described, it is not my intention to limit its scope thereby, or otherwise than by the terms of the appended claims.

I claim:

1. Starting mechanism comprising, in combination, a peripherally grooved wheel, a motor having a drive shaft, a driving gear on said shaft, a rocker arm shiftable about the axis of said shaft by the torque thereof, and a gear carried by the arm and having teeth meshing with the teeth of the driving gear, the teeth being grooved to engage the grooves in the flywheel.

2. Starting mechanism comprising, in combination, a peripherally grooved wheel, a motor having a drive shaft, and a second wheel geared to the shaft and arranged for bodily movement relatively to the shaft to engage the grooved wheel, the second wheel being formed with spirally arranged rows of teeth meshing in the grooves of the first wheel.

3. Starting mechanism comprising, in combination, a peripherally grooved wheel, a motor having a drive shaft, a spiral driving gear on said shaft, and a driven gear having grooved spiral teeth meshing with the teeth of the driving gear and arranged to be rocked by the torque of the shaft to mesh with the grooves in said wheel.

4. Starting mechanism comprising, in combination, a peripherally grooved wheel, a motor having a drive shaft, a spiral driving gear on the shaft, a rocker arm yieldingly urged away from the grooved wheel, and a driven gear carried by the arm having grooved spiral teeth meshing with the teeth of the driving gear, the arm being so arranged that the torque of said shaft rocks the arm to cause the grooves of the teeth of the driven gear to mesh with the grooves in said wheel.

5. Starting mechanism comprising, in combination, a peripherally grooved wheel, a motor having a drive shaft, and a second wheel geared to the shaft and arranged for bodily movement relatively thereto to engage the grooved wheel, the second wheel consisting of a plurality of disks secured together, each disk being formed with radially projecting teeth thinned down to fit in the grooves of the first wheel.

6. Starting mechanism comprising, in combination, a peripherally grooved wheel, a motor having a drive shaft, and a second wheel geared to the shaft and arranged for bodily movement relatively thereto to engage the grooved wheel, the second wheel consisting of a plurality of disks secured together, each disk being formed with radially projecting teeth thinned down to fit in the grooves of the first wheel, the teeth on the various disks being arranged in spiral rows to form spiral teeth as described.

In testimony whereof I affix my signature.

LLOYD BLACKMORE.